United States Patent [19]

Hohlbein et al.

[11] 3,962,478

[45] June 8, 1976

[54] METHOD AND APPARATUS FOR PRODUCING BEER WORT

[76] Inventors: Gerhard Hohlbein, Buchenhorst 3, D6100 Darmstadt; Heinrich Huppmann, Schwarzacherstrasse, D871 Kitzingen (Main), both of Germany

[22] Filed: June 5, 1974

[21] Appl. No.: 476,708

[30] Foreign Application Priority Data

June 8, 1973    Germany............................ 2329360

[52] U.S. Cl.................................. 426/495; 99/278; 426/16; 426/29; 426/478; 426/490; 426/624
[51] Int. Cl.$^2$...................... C12C 7/00; C12C 7/16; C12C 9/00
[58] Field of Search ............... 426/16, 29, 478, 495, 426/624; 99/276, 277, 278, 495, 490

[56] References Cited
UNITED STATES PATENTS

| | | | |
|---|---|---|---|
| 1,922,730 | 8/1933 | Gore et al. | 426/495 X |
| 2,758,030 | 8/1956 | Metz | 426/495 X |
| 3,380,373 | 4/1968 | Lenz | 99/278 |
| 3,436,226 | 4/1969 | Schaus | 426/478 |
| 3,782,551 | 1/1974 | Soldan | 99/278 |

*Primary Examiner*—David M. Naff
*Attorney, Agent, or Firm*—Michael J. Striker

[57] ABSTRACT

Mash is separated into draff and clarified beer wort using a cylindrical upright vessel having an upper portion with a circumferential wall, a lower portion conically converging toward an apertured support forming the bottom of the vessel, and a suction chamber connected to the vessel bottom having a lower conical portion with an outlet for wort and having a conduit leading from the side for applying a vacuum. Separating mash into draff and wort is carried out by positioning a cellulose silver layer on the apertured support, introducing a mash stream into the vessel near the upper portion tangentially against an inner side of the vessel, allowing solids to settle and become deposited as a cake on the filter and to form a beer wort above the cake composed of a clear upper layer and a lower layer containing suspended solids above and proximal to the cake, applying suction to the apertured bottom to draw the lower layer downwardly through the cake to intercept suspended solids in the cake and accumulate a clear wort below the filter until all of the lower layer is removed from the vessel, and withdrawing the upper clear layer out of the vessel upwardly from above the cake.

6 Claims, 2 Drawing Figures

METHOD AND APPARATUS FOR PRODUCING BEER WORT

BACKGROUND OF THE INVENTION

The present invention relates generally to the production of beer, and more particularly to a method of producing beer wort from a mash made of malt powder, and an apparatus for carrying out the method.

Beer wort is made by producing a mash of malt and cereal grains, and thereupon separating the clarified liquid beer wort fraction of the mash from the residue, the so-called draff. The longer the liquid fraction, that is the beer wort, is in contact with the solid components of the mash, which subsequently will become the draff, the more it will leach out bitter-tasting components of the malt with the result that the beer wort itself will assume a bitter taste. This is undesirable, but has heretofore been impossible to avoid because inevitably some of the beer wort will contain suspended impurities which have been leached out from the draff and which carry with them the bitterness-causing aromatics.

SUMMARY OF THE INVENTION

Accordingly, it is an object of the present invention to avoid the shortcomings of the prior art.

More particularly, it is an object of the present invention to provide a method of producing beer wort wherein a simple and reliable separation of clarified beer wort and draff is obtained, with no impurities being retained in the clarified beer wort.

Another object of the invention is to provide an apparatus for carrying out the method.

In keeping with the above objects, and with others which will become apparent hereafter, one feature of the invention resides in a method of producing beer wort from a mash made of malt powder, which comprises the steps of directing a stream of mash against an inner wall surface of a vessel to cause deposition of the draff on the wall surface as a result of centrifugal force, and subsequent settling of the draff at the vessel bottom and formation of a cake, while the vessel fills above the bottom with beer wort to a predetermined level. Thereupon, that fraction of the beer wort which is located above and proximal to the cake, is withdrawn downwardly through the cake so as to intercept suspended impurities from this fraction in the cake. The remaining fraction of beer wort is withdrawn from the vessel above the cake, and the cake is then removed.

This method has the twofold advantage of significantly reducing the length of time during which the draff containing the bitter aromatics has contact with the liquid beer wort, so that the possibility of leaching-out of these aromatics is reduced. The other advantage is the fact that the impurities, which carry with them some proportion of these bitterness-causing aromatics, are quickly and reliably filtered out of the beer wort when that fraction wherein the impurities are suspended is, withdrawn through the cake of draff.

It is a part of the concept of the present invention that the draff cake is made to form on a fibrous sliver which is placed in the region of the bottom of the vessel, and it has been found—quite surprisingly—that when the fraction of the liquid beer wort which is located above and in the region of the cake and wherein the suspended impurities are present, is withdrawn through the filter cake and the fibrous sliver, substantially all of the impurities are retained in the cake and the fibrous sliver, and beneath the cake the previously turbid beer wort fraction becomes available as a very clear beer wort that can be later united with the fraction of beer wort that was located higher up in the vessel and that was already clear of impurities. The fibrous sliver is advantageously of cellulose fibers and it must be replaced after each operation. Since cellulose fibers are not harmful when ingested by animals, the fibrous sliver can be used together with the discarded cake of draff as animal fodder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
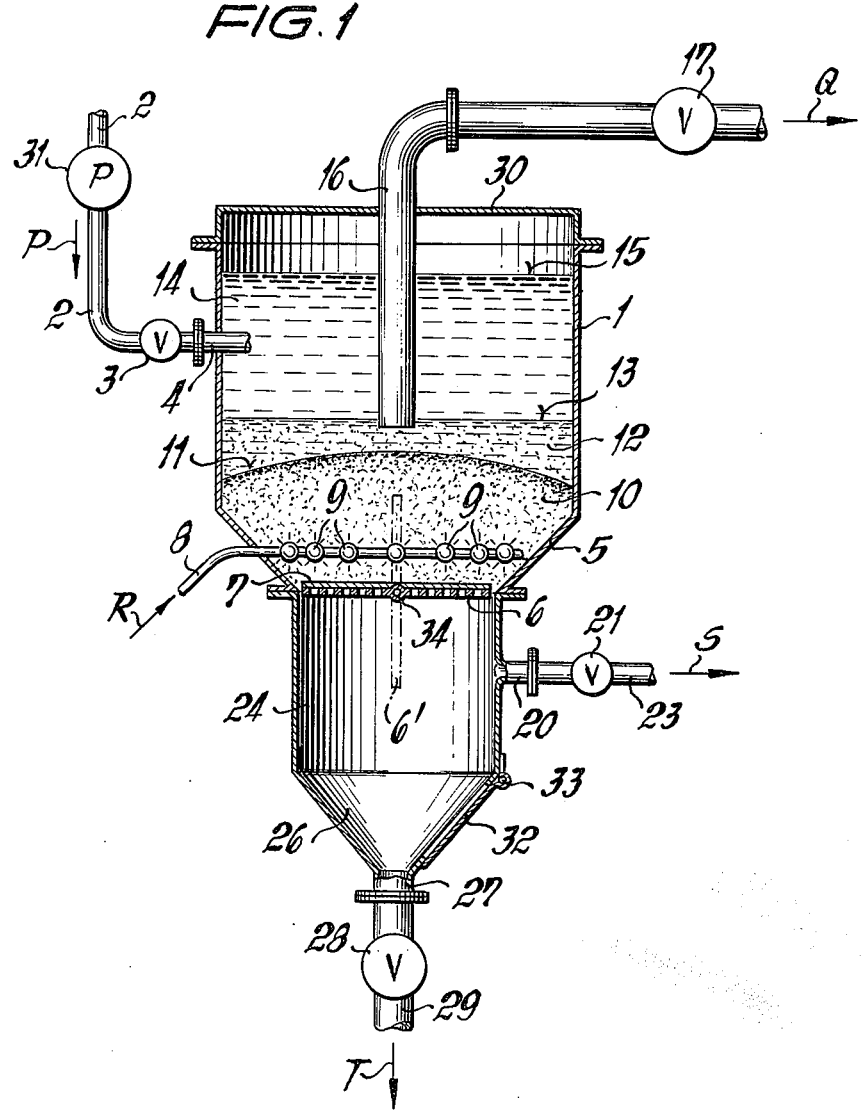
FIG. 1 is a diagrammatic side elevational view illustrating an apparatus for carrying out the invention.
Figure 2:
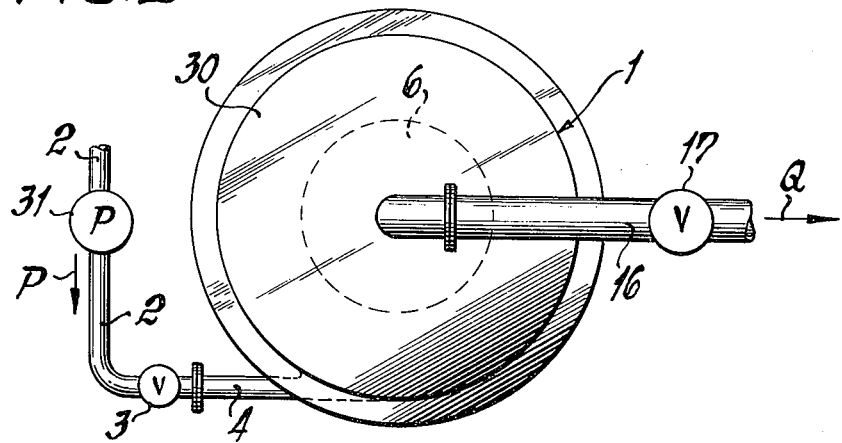
FIG. 2 is a top plan view of FIG. 1, again in diagrammatic illustration.

Referring to FIGS. 1 and 2, wherein a simple exemplary embodiment has been illustrated of an apparatus according to the present invention, which is capable of carrying out the method according to the present invention, it will be seen that reference numeral 1 identifies a separating vessel 1 which is of upright orientation and into which a conduit 2 discharges via a conduit portion 4. Conduit 2 receives a mash of powdered cereal grain, such as malt, from a non-illustrated mash tank or the like, so that it flows in the direction of the arrow P, being pumped by the diagrammatically illustrated pump 31 which is interposed in the conduit 2. The conduit portion 4 discharges tangentially with reference to the inner circumferential wall of the vessel 1, as shown in FIG. 2. A valve 3 is interposed in the conduit portion 4 to regulate the flow if and when required.

FIG. 1 shows most clearly that the vessel 1 has a bottom formed with a screen or sieve bottom wall 6, which may be in form of an apertured sheet metal plate, and which supports on it a layer of fibrous sliver 7 which, as pointed out earlier, is advantageously of cellulose fibers. The bottom wall 6 can be pivoted about the diagrammatically illustrated axis 34 into the broken-line position 6' that is shown in FIG. 1.

The upper end of the vessel 1 may be provided with a cover which is diagrammatically illustrated and identified with reference numeral 30.

Located below the bottom wall 6 is a suction chamber 24 having a funnel-shaped lower end portion 26 having in a side wall thereof an opening which can be opened or closed by a pivotally mounted flap-type door 32 which can be pivoted about an axis defined by the hinge 33. It is evidently not necessary to illustrate how the hinge 33 is constructed, nor how the door 32 can be held in place when the opening is to be closed. The lower end of the portion 26 is provided with an outlet 27 for liquid beer wort, which outlet 27 communicates via a valve 28 with an outlet conduit 29 through which the beer wort is discharged in the direction of the arrow T for further processing and use.

A side wall of the chamber 24 is provided with a conduit 20 that communicates with the interior of the chamber 24 and that is connected via a valve 21 with a connecting conduit 23; the latter is connected with a non-illustrated source of suction, as indicated diagrammatically by the arrow S. Such a source of suction may be a vacuum pump or the like and is well known in the art.

The vessel 1 is provided at a location upwardly spaced from the bottom wall 6 with an upwardly extending conduit 16 having a valve 17 interposed in it, and communicating with the pump or the like (not shown), as is diagrammatically indicated by the arrow Q to show that through this conduit 16 the clear liquid beer wort is withdrawn.

The lower portion 5 of the vessel 1 is downwardly conically convergent and provided with an annular conduit 8 formed with nozzles 9 located in the interior of the portion 5, through which nozzles 9 water can be sprayed which is admitted through the conduit 8 in the direction of the arrow R.

In operation of the apparatus in FIGS. 1 and 2, and in carrying out the method according to the present invention, mash is admitted from the non-illustrated source via the conduit 2 and the pump 31 into the vessel 1. The mash is admitted in form of a stream which is injected tangentially into the vessel 1 so that, due to the centrifugal force which develops, the solid components of the mash are forced against the circumferential wall of the vessel 1 along which they slide downwardly to become deposited on the layer of fibrous slivers 7 to form a cake of draff thereon. The upper contour of this cake 10 is illustrated in broken lines and designated with reference numeral 11 in FIG. 1. The cake 10 will have approximately this upper contour 11 by the time by which the vessel 1 will be filled to the level 15 with beer wort.

The beer wort contents of the vessel 1 at this time will be composed of two fractions, namely the upper fraction 14 which is clear, and the turbid lower fraction 12 which extends substantially from the level 13 to the cake 10 and contains impurities that are suspended in it. It should be understood, of course, that the lines 11 and 13 really constitute only exemplary delineations, since in actual fact there is more or less of a continuous merging of the fractions 12 and 14, and of the fraction 12 with the cake 10, rather than a very sharp and clear-cut line of division.

When the level of beer wort in the vessel 1 has reached the upper level 15, the valve 21 is opened and suction is now applied to the underside of the bottom wall 6, thereby drawing beer wort through the cake 11 and the fibrous sliver 7 into the chamber 24. A certain amount of penetration and filtration of beer wort through the cake 11 has, of course, begun previously, that is before the valve 21 was opened, but the application of suction to chamber 24 greatly increases the flow and results in the total withdrawal of the fraction 12 through the cake 10 and the fibrous sliver 7 and into the chamber 24. The filtration action of the cake 10 and the sliver 7 removes all impurities suspended in the beer wort fraction 12, so that the beer wort which accumulates in the chamber 24 is clear. Once this fraction 12 has been removed, the remaining (and clear) fraction 14 of beer wort is withdrawn via the conduit 16, and may later on have the clarified beer wort from the chamber 24 admixed with it. Vessel 1 may have a sightglass for inspection of the fractions.

When the withdrawal of the beer wort from the vessel 1 is completed, water is admitted in the direction of the arrow R into the conduit 8 and sprayed from the nozzles 9 into the draff cake 10, so that a further amount of aromatics is washed out of the draff. This additionally produced beer wort is again turbid, and is therefore again withdrawn via the suction action produced by operation of the valve 21, which was closed during admission of the water, through the cake 10 and the sliver 7 into the chamber 24. This operation may be repeated several times, until the draff has been leached out to the desired extent. When this point in the operation has been reached, the bottom wall 6 is tilted about the pivot axis 34 to the illustrated chain-line position 6', so that the cake 10 and the fibrous sliver 7 can drop into the chamber 24 from which the beer wort has, of course, been previously evacuated through the outlets 27, 29 by opening the valve 28. The cake 10 and the sliver 7 are then removed from the chamber 24 by opening the door 32, and can be jointly used as animal fodder. Subsequently, the door 32 is closed, the bottom 6 is restored to its full-line horizontal position, and a new layer of fibrous sliver 7 is placed upon it before additional mash is admitted for the next operating cycle.

Utilizing finely divided powder for making the mash, and then resorting to the present method and using the apparatus for carrying it into effect, it has been found that the operations can be substantially speeded up as opposed to the prior art. For instance, the mash time is reduced to only 45 minutes as compared to 180 minutes required in conventional clarifying tanks in which coarse ground mash is introduced. Moreover, by using a mash made out of fine powder of barley malt, a degree of extraction of aromatics is obtained which corresponds to the degree of extraction that can be had under laboratory conditions, i.e., which is substantially better than the commercial extraction that was previously obtainable with coarse ground mash. At the same time, the time required for brewing the beer is reduced from the previously required eight hours to a mere two hours by resorting to the present invention, thus introducing further economy. Moreover, by utilizing two of the apparatuses disclosed in FIGS. 1 and 2, and by operating them alternately, it is possible to obtain in effect a continuous operation.

It will be understood that each of the elements described above, or two or more together, may also find a useful application in other types of constructions differing from the type described above.

While the invention has been illustrated and described as embodied in the production of beer wort from a mash, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of separating mash into draff and clarified beer wort in a cylindrical upright vessel having an upper portion and a lower portion conically converging toward an apertured support forming the bottom of the vessel, comprising the steps of positioning a filter including a fibrous cellulose sliver layer on the apertured support; introducing a mash stream into the vessel near the upper portion tangentially against an inner circumferential side of the vessel so that solid components in the mash are forced against the side of the vessel due to centrifugal force; allowing the solids to settle and become deposited as a cake on the filter; filling the vessel to a predetermined level to provide above the cake a beer wort composed of two fractions, one of which is clear upper layer and the other of which is a lower layer containing suspended solids and being located above and proximal to the cake; applying suction to the apertured bottom of the vessel to draw the lower layer containing suspended solids downwardly through the cake to thereby intercept the suspended solids in the cake and accumulate clear wort below the filter until all of the lower layer is removed from the vessel; and withdrawing the upper clear layer in the vessel out of the same upwardly from above the cake.

2. A method as defined in claim 1, further comprising the step of removing said cake and sliver together for subsequent use as animal fodder.

3. A method as defined in claim 1; and further comprising the step of washing said cake with water from within said vessel, and withdrawing the washing water through said cake.

4. A method as defined in claim 3, wherein the step of washing is carried out repeatedly.

5. A method as defined in claim 1, wherein said suction-applying step includes evacuating a suction chamber connected to the bottom of the vessel so that the lower layer of wort is drawn through said cake and said fibrous cellulose sliver into said suction chamber and accumulates therein.

6. In an apparatus for producing beer wort from a mash, a combination comprising a cylindrical upright vessel having an apertured conically convergent potton and a circumferential wall; a filter on said bottom, said filter including a fibrous cellulose sliver layer; a mash inlet above said bottom and positioned to discharge a stream of mash tangentially against an inner side of said circumferential wall; a suction chamber connected to said bottom and having a conical lower portion; a conduit communicating with said suction chamber and leading from the side thereof to apply vacuum to said suction chamber and suction to the apertured bottom of the vessel to draw wort downward through the bottom; a wort outlet from the suction chamber communicating with the bottom of said conical down portion; and a wort conduit communicating with said vessel near the center thereof and above said filter and operative for withdrawing wort above the filter upward and out of the vessel.

* * * * *